United States Patent

Negishi

[11] Patent Number: 6,056,398
[45] Date of Patent: May 2, 2000

[54] OPTHALMIC FRAME FOR BI-FOCAL LENSES AND NOSE PATCH THEREFOR

[76] Inventor: Tohru Negishi, 264-2, Bonsai-cho, Omiya-shi, Saitama-ken, Japan

[21] Appl. No.: 09/245,685

[22] Filed: Feb. 8, 1999

[30] Foreign Application Priority Data

Feb. 10, 1998 [JP] Japan .................................. 10-028294
Sep. 14, 1998 [JP] Japan .................................. 10-260264
Dec. 25, 1998 [JP] Japan .................................. 10-369867

[51] Int. Cl.$^7$ .................................................. G02C 7/06
[52] U.S. Cl. ................................................ 351/55; 351/137
[58] Field of Search ............................... 351/55, 137, 54, 351/65, 78, 80, 136, 138, 41

[56] References Cited

U.S. PATENT DOCUMENTS 4,896,957 1/1990 Speer .
5,691,796 11/1997 Negishi .

FOREIGN PATENT DOCUMENTS 0 032 475A 7/1981 European Pat. Off. .
35 15 741A 9/1985 Germany .

OTHER PUBLICATIONS

Japan Patent Abstract, Pub. No. 09 185020A, vol. 097, No. 011, Nov. 1997.
Japan Patent Abstract, Pub. No. 08 292400A, vol. 097, No. 003, Mar. 1997.

*Primary Examiner*—Hung Xuan Dang
*Attorney, Agent, or Firm*—Clifford W. Browning; Woodard, Emhardt, Naughton, Moriarty & McNett Patent and Trademark Attorneys

[57] ABSTRACT

An ophthalmic mounting for bifocal lenses includes a pair of rims on which a pair of right and left bifocal lenses are mounted. The rims are symmetrically arranged with respect to a vertical axis. The ophthalmic mounting includes a pair of pad arms connected to the rims, and a pair of nose pads detachably secured to the pad arms and oriented to diverge downwardly from the vertical axis. The nose pads includes a pair of generally flat bodies, a pair of guides integrally formed in the bodies and having a pair of elongated guide recesses, and a pair of slides. The slides have a pair of sliding portions slidably received within the respective guide recesses, and a pair of mounting portions connected to the respective sliding portions and detachably secured to the pad arms. The guide recesses lie on two substantially parallel imaginary vertical planes, respectively so as to enable the slides to be smoothly moved along the guide recesses.

18 Claims, 14 Drawing Sheets

OPTHALMIC FRAME FOR BI-FOCAL LENSES AND NOSE PATCH THEREFOR

BACKGROUND OF THE INVENTION

The present invention relates to improvements in ophthalmic mountings for use with bifocal lenses.

Many attempts have heretofore been made to raise and lower eyeglass lenses before the eyes of a user so that two or more different focal fields of the lenses can be moved into and out of desired position of use. Japanese laid-open utility model publication No. 63-122321 discloses an ophthalmic mounting for bifocal lenses, which permits two focal fields of the lenses to be moved to the most comfortable position of use for near or distance vision. The conventional mounting includes a sleeve secured to each nose pad by a pin, and a sliding member secured to each eyeglass rim. The sliding member is in the form of a rectangular frame and has a slightly arcuate spring. When the sliding member is inserted into the sleeve, the spring is urged against the pin so as to allow the near vision field of the bifocal lenses may be raised and lowered as desired and retain their positions of adjustment during use. A problem with this conventional mounting is such that the eyeglass frames or rims can not smoothly be moved to desired position of use due to frictional force developed between the spring and the pin.

One approach to this problem is disclosed in U.S. Pat. No. 5,691,796 issued to Negishi. In the patent to Negishi, a pair of upper magnets and a pair of lower magnets are secured to the upper and lower ends of nose pads, respectively. The nose pads include respective elongated guide recesses or bores of a circular cross section. A pair of slides are secured to a corresponding pair of pad arms. The slides have a circular cross section so that they can smoothly be moved within the guide recesses. A pair of movable magnets are secured to the respective slides. For distance vision, the movable magnets are magnetically attached to the lower fixed magnets. For near vision, the movable magnets are magnetically attached to the upper fixed magnets. The nose pads, when secured to the pad arms, are oriented to diverge downward. The guide recesses also diverge downward. In other words, the distance between the upper end of the right nose pad and that of the left nose pad is different from the distance between the lower end of the right nose pad and that of the left nose pad. The distance between the pad arms is however constant since the pad arms are secured to the respective rims. In this design, when the frame is lifted up for near vision, the nose pads are laterally spread due to friction between the slides and the guides recesses. This friction causes downward movement of the nose pads and thus, retards upward movement of the frame. When the frame is lowered to change from near vision to distance vision, the nose pads are forced to move toward each other due to fiction between the slides and the guide recesses. This friction causes upward movement of the nose pads and thus, retards downward movement of the frame.

Accordingly, it is an object of the present invention to provide an ophthalmic mounting for bifocal lenses which allows two or more different focal fields of lenses to be smoothly moved into and out of desired position of use.

SUMMARY OF THE INVENTION

According to one aspect of the present invention, there is provided an ophthalmic mounting for bifocal lenses, which comprises a pair of right and left lens holding elements symmetrically arranged with respect to a vertical axis and adapted to mount a corresponding pair of right and left eyeglass lenses each with a plurality of focal fields, a pair of right and left pad arms having distal ends, and proximal ends connected to the lens holding elements, and a pair of right and left nose pads detachably secured to the pad arms and arranged to diverge downwardly from the vertical axis.

The nose pads include a corresponding pair of right and left bodies each with an axis extending between its upper and lower ends and inclined relative to the vertical axis, said pair of right and left bodies further including a corresponding pair of elongated right and left guide recesses, a corresponding pair of right and left slides having a pair of right and left sliding portions slidably received within the respective guide recesses, and a pair of right and left mounting portions connected to the respective sliding portions and detachably secured to the distal ends of the pad arms, a pair of right and left upper magnets fixedly mounted within the corresponding right and left guide recesses and located adjacent to the upper end of the respective bodies, a pair of right and left lower magnets fixedly mounted within the respective guide recesses and located adjacent to the lower end of the respective bodies, and a pair of right and left movable magnets mounted to the respective sliding portions and selectively attached to the upper and lower magnets. As a feature, the guide recesses lie on two substantially parallel imaginary vertical planes, respectively.

The guide recesses are normally disposed in the respective imaginary vertical planes. Alternatively, the guide recesses may be rearwardly inclined at an angle of 5 to 20 degrees relative to a normal. The slides are mounted to one side of the bodies. Preferably, the bodies have a plurality of transverse grooves on their other side. The bodies include a corresponding pair of elongated right and left guides within which the guide recesses are defined. The guides have a substantially rectangular cross section. The guides may alternatively have a triangular cross section. Preferably, the sliding portions extend perpendicularly from one side of the mounting portions and also, parallel to the flat bodies.

According to another aspect of the present invention, there is provided a set of nose pads adapted for use in an ophthalmic mounting and when secured to a corresponding set of pad arms of the ophthalmic mounting, oriented to diverge downwardly from a vertical axis. The nose pads comprise a corresponding set of bodies each with an axis extending between its upper and lower ends and inclined relative to the vertical axis, said bodies further including a corresponding set of elongated guide recesses, a corresponding set of slides having sliding portions slidably received within the respective guide recesses, and mounting portions connected to the respective sliding portions and adapted to be detachably secured to the respective pad arms, a set of upper magnets fixedly mounted within the respective guide recesses and located adjacent to the upper end of the respective bodies, a set of lower magnets fixedly mounted within the respective guide recesses and located adjacent to the lower end of the respective bodies, and a set of movable magnets mounted to the respective sliding portions and selectively attached to the upper and lower magnets. The guide recesses lie on two substantially parallel imaginary vertical planes, respectively. By this arrangement, the distance between the upper end of the right guide recess and that of the left guide recess is equal to the distance between the lower end of the right guide recess and that of the left guide recess. Thus, the slides can smoothly be moved along the parallel guide recesses.

These and other features and advantages of the present invention will become apparent from the following detailed description of the invention when taken in conjunction with the accompanying drawings wherein like reference numerals designate like or corresponding elements throughout the several views.

DETAILED DESCRIPTION OF THE INVENTION

Figure 1:
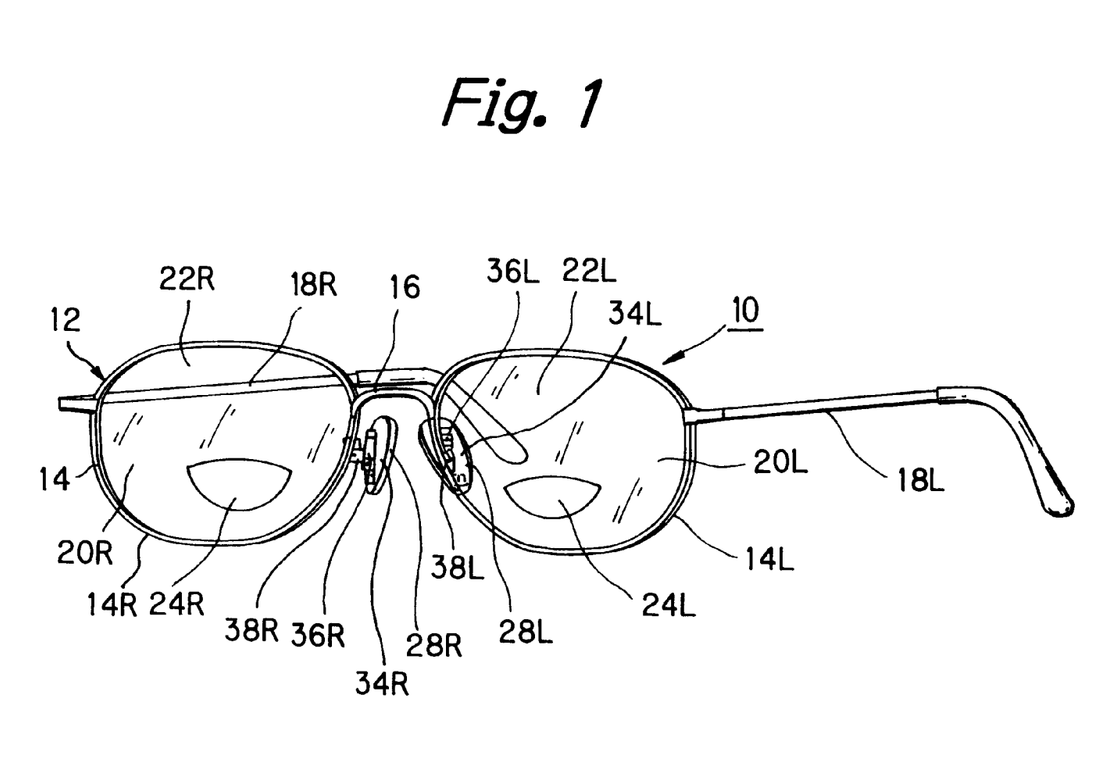
FIG. 1 is a perspective view of an ophthalmic mounting for bifocal lenses, assembled according to one embodiment of the present invention.
Figure 2:
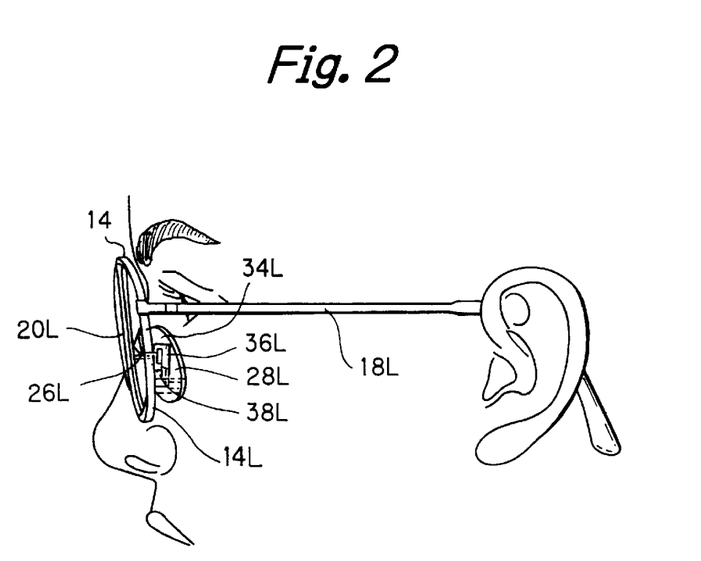
FIG. 2 is a side view of the ophthalmic mounting shown in FIG. 1.

Referring now to FIGS. 1 and 2, there is illustrated eyeglasses generally designated at 10 and incorporating an ophthalmic mounting for bifocal lenses, assembled according to one embodiment of the present invention. An ophthalmic mounting 12 includes a frame 14 composed of a pair of ellipsoidal rims 14R, 14L joined by a bridge 16, and a pair of temples 18R, 18L swiveled at their one end on the corresponding rims 14R, 14L. A pair of bifocal lenses 20R, 20L are mounted on the rims 14R, 14L, respectively. The lenses 20R, 20L have distance fields 22R, 22L at their upper end and near vision fields 24R, 24L at their lower end. The ophthalmic mounting 12 is designed to move the two different focal fields upwardly or downwardly to two different positions of use before the eyes of a user. It is to be understood, however, that the present invention may be used with lenses having three or more different focal fields.

Figure 3:
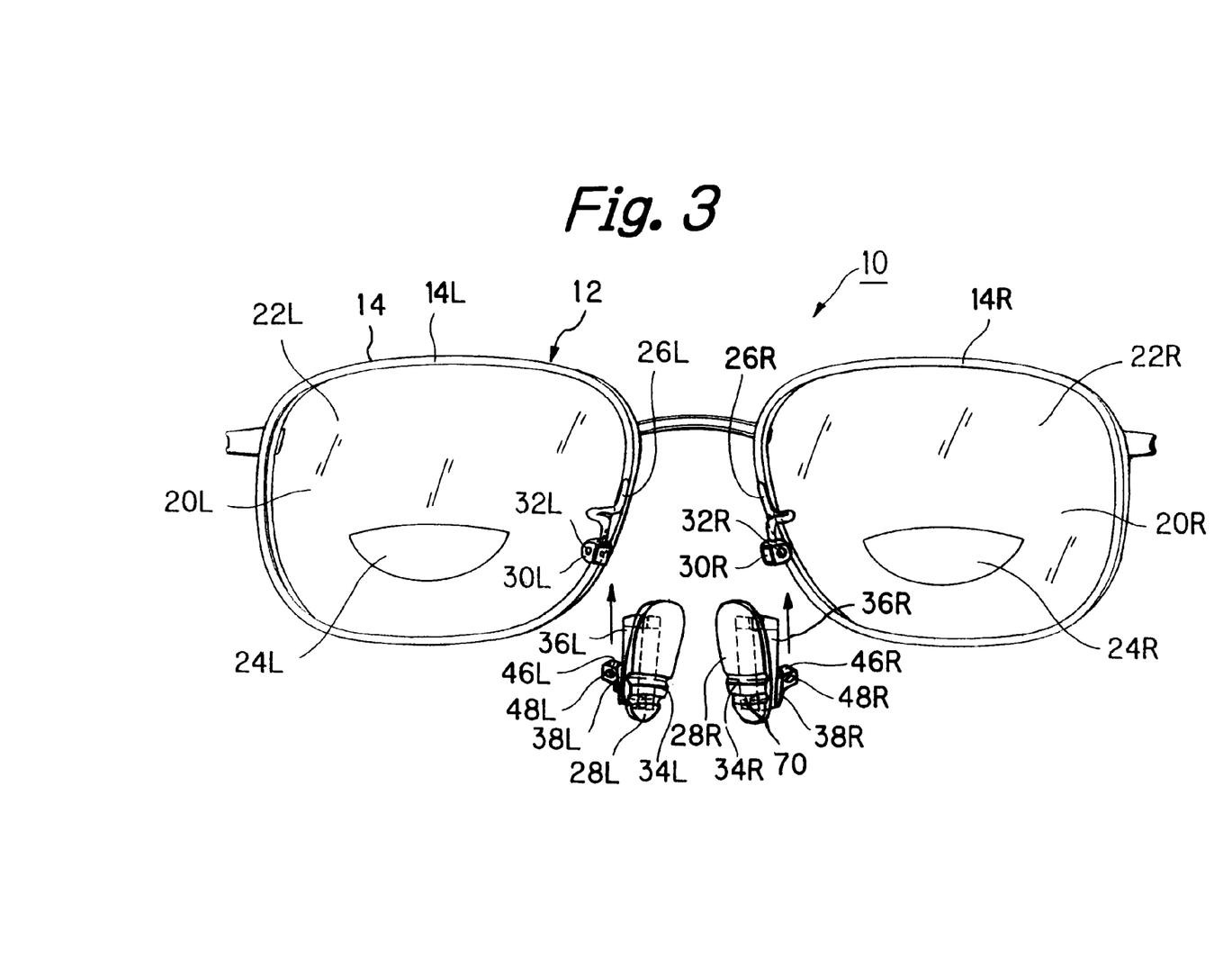
FIG. 3 is an exploded rear view showing the manner in which a pair of right and left nose pads are secured to a corresponding pair of right and left pad arms.
Figure 4:
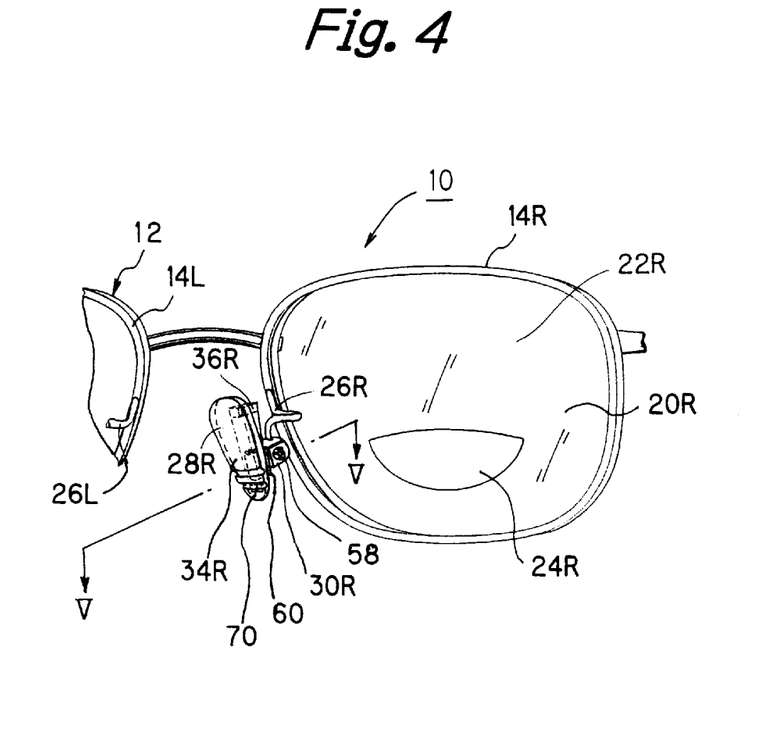
FIG. 4 is a partial rear view of the ophthalmic mounting with the right nose pad completely secured to the distal end of the right pad arm.

Referring to FIGS. 3 and 4, a pair of pad arms 26R, 26L have proximal ends connected to the respective rims 14R, 14L. A pair of nose pads 28R, 28L are detachably secured to the distal ends of the pad arms 26R, 26L. The pad arms 26R, 26L are bent at their center into a substantially U-shape. A pair of mounts 30R, 30L are fixedly secured to the distal ends of the pad arms 26R, 26L and have respective through holes 32R, 32L. The nose pads 28R, 28L generally include a corresponding pair of bodies 34R, 34L made of a suitable synthetic resin, a corresponding pair of rectangular guides 36R, 36L raised from one side of the bodies 34R, 34L, and a corresponding pair of slides 38R, 38L slidably mounted to the bodies 34R, 34L through the guides 36R, 36L. The bodies 34R, 34L of the nose pads 28R, 28L are ellipsoidal in shape. The bodies 34R, 34L may, of course, take any other shape.

Figure 5:
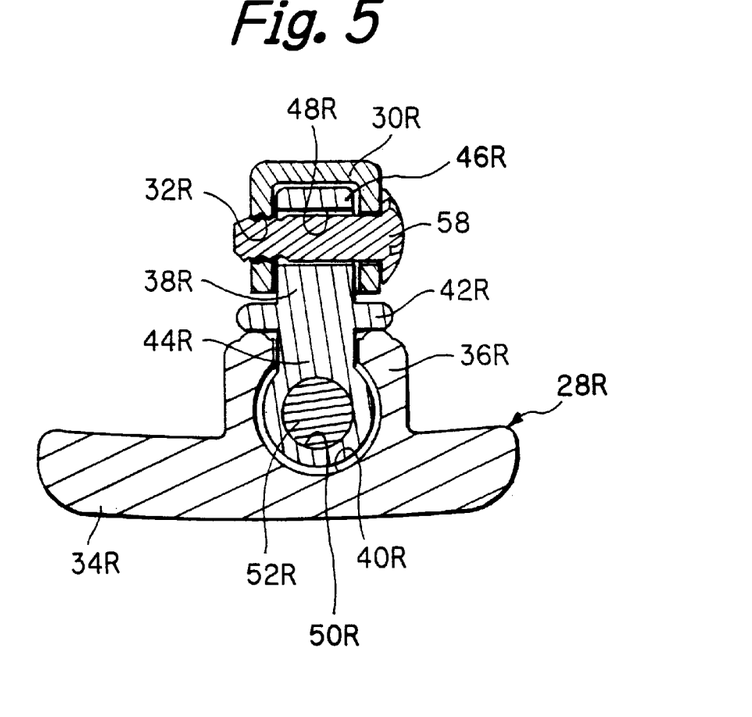
FIG. 5 is a sectional view taken on the line V—V in FIG. 4.

Referring to FIG. 5, the bodies 34R, 34L (only the right body is shown in FIG. 5 since one is a mirror image of the other) are generally flat although slightly arcuate along their width. The guides 36R, 36L include respective guide recesses 40R, 40L of a substantially circular cross section. The slides 38R, 38L are made of a suitable synthetic resin and include respective rectangular sliding plates 42R, 42L slidably placed on the top of the guides 36R, 36L, generally cylindrical sliding portions 44R, 44L connected to one side of the sliding plates 42R, 42L, and mounting portions 46R, 46L connected to the other side of the sliding plates 42R, 42L and including respective through holes 48R, 48L. The sliding portions 44R, 44L have a substantially circular cross section so that they may smoothly be slid within the respective cylindrical guide recesses 40R, 40L. The sliding portions 44R, 44L have holes 50R, 50L to receive respective magnets 52R, 52L. A pair of upper magnets 54R, 54L (see FIG. 8) are fixedly mounted within the guide recesses 40R, 40L and located adjacent to the upper end of the bodies 34R, 34L. Similarly, a pair of lower magnets 56R, 56L (see FIG. 8) are fixedly mounted within the guide recesses 40R, 40L and located adjacent to the lower end of the bodies 34R, 34L. To secure the nose pads 28R, 28L to the pad arms 26R, 26L, the through holes 48R, 48L of the mounting portions 46R, 46L are first aligned with the corresponding holes 32R, 32L of the mounts 30R, 30L. Screws 58, 58 are then threaded into the aligned holes.

Figure 6:
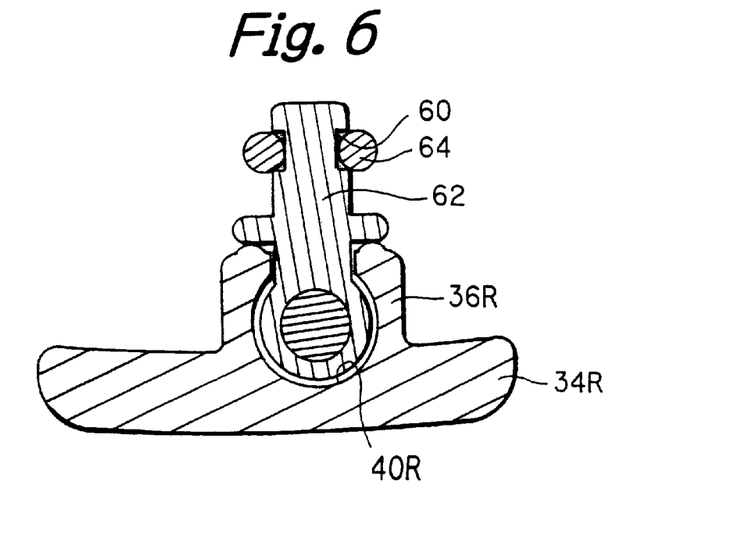
FIG. 6 is a view similar to that of FIG. 5, but showing a modified form of the nose pad.

In the embodiment shown in FIGS. 1 to 5, the screws are employed to secure the nose pads 28R, 28L to the pad arms 26R, 26L. Alternatively, an annular groove 60 may be formed in each mounting portion 62, and a pad arm may have an end ring 64, as shown in FIG. 6. The end ring 64 may be fitted around the annular groove 60 to secure the nose pad to the corresponding pad arm.

Figure 7:
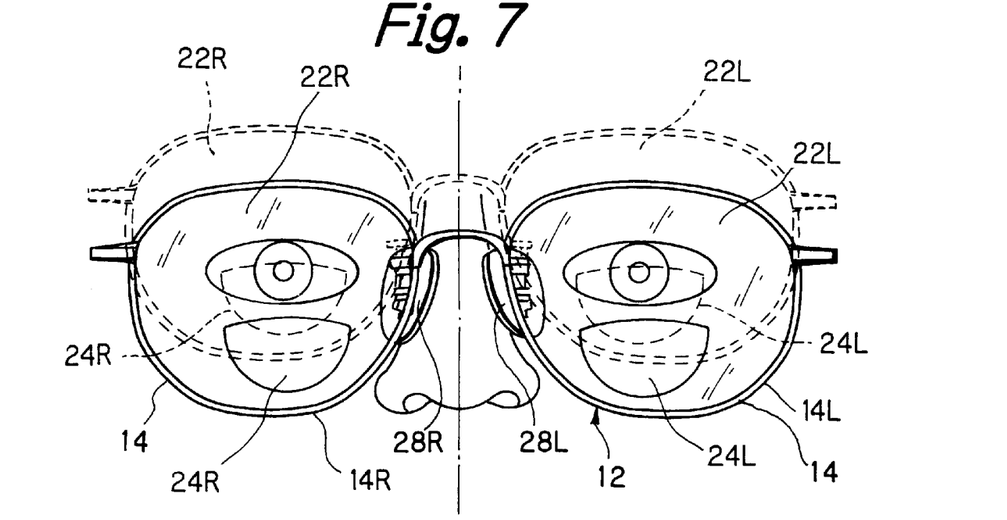
FIG. 7 is a front view of the ophthalmic mounting with two different focal positions shown by solid and broken lines, respectively.
Figure 8:
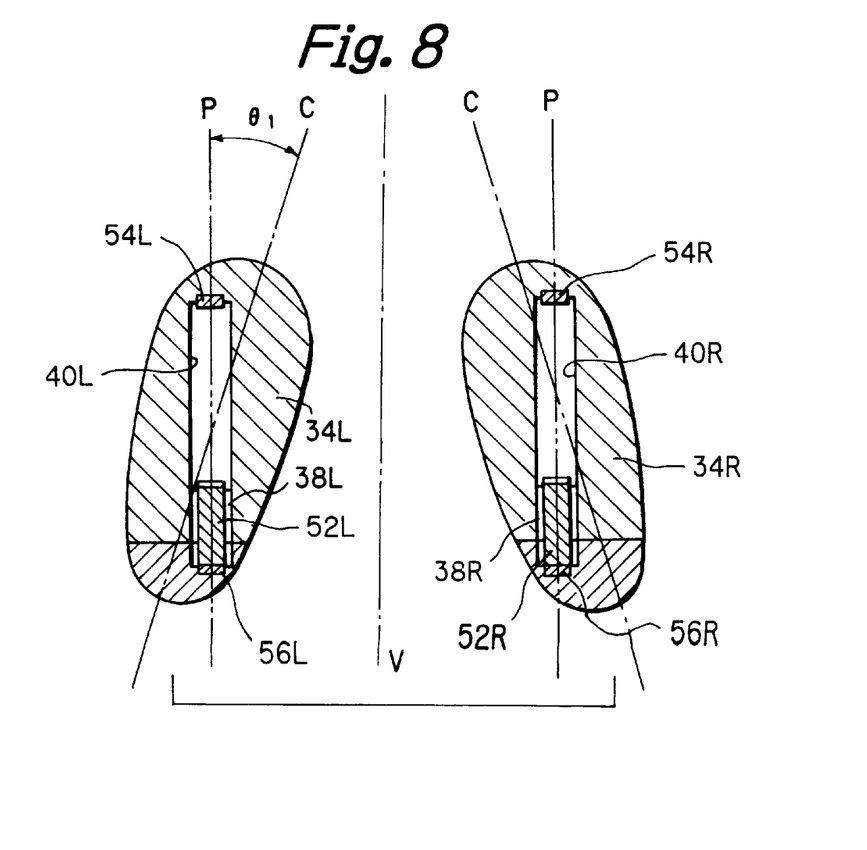
FIG. 8 is a vertical sectional view of the nose pads shown in FIG. 7.

When the lenses 20R, 20L are in their lowered position for distance vision as shown by solid line in FIG. 7, the movable magnets 52R, 52L are attached to the lower magnets 56R, 56L (see FIG. 8). To change from distance vision to near vision, an upward force is applied to a suitable part of the frame 14 so as to release the movable magnets 52R, 52L from the lower magnets 56R, 56L. The slides 38R, 38L are moved along the guides 36R, 36L until the movable magnets 52R, 52L are attached to the upper magnets 54R, 54L. The lenses 20R, 20L are now retained in their upper position for near vision as shown by broken line in FIG. 7. To return from near vision to distance vision, a downward force is applied to the frame 14 so as to release the movable magnets 52R, 52L from the upper magnets 54R, 54L. This force continued to be applied until the movable magnets 52R, 52L are attached to the lower magnets 56R, 56L.

Figure 16:
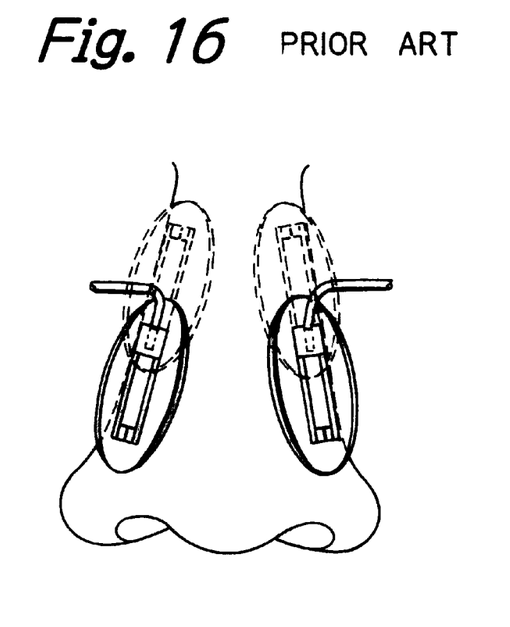
FIG. 16 is a front view of a pair of conventional nose pads placed on the nose of a user.

As shown in FIGS. 7 and 8, the nose pads 28R, 28L, when placed on the nose of a user, are laterally symmetrical with respect to a vertical axis V and slightly diverge downwardly from the vertical axis V. Accordingly, the distance between the upper end of the right nose pad 28R and that of the left nose pad 28L is shorter than the distance between the lower end of the right nose pad 28R and that of the left nose pad 28L, whereas the distance between the distal end of the right pad arm 26R and that of the left pad arm 26L is constant. If guide recesses slightly diverge downward as in a conventional ophthalmic mounting (see FIG. 16), when the frame is lifted to change from distance vision to near vision, a pair of nose pads are laterally spread or widened. At this time, friction is generated between slides and corresponding guides. This friction causes downward movement of the nose pads and thus, retards upward movement of the frame. On the other hand, when the frame is lowered to change from near vision to distance vision, the nose pads are forced to move toward each other. At this time, friction is also generated between the slides and the guides. This friction causes upward movement of the nose pads and thus, retards downward movement of the frame.

To this end, according to the present invention, the guide recesses 40R, 40L in the guides 36R, 36L lie on two parallel imaginary vertical planes P, P, respectively. As best shown in FIG. 8, each of the nose pads 28R, 28L has a longitudinal central axis C extending between its upper and lower ends. When the nose pads 28R, 28L are secured to the pad arms 26R, 26L, the nose pads 28R, 28L are laterally symmetrical with respect to the vertical axis V, with their central axes C, C inclined at an angle $\theta_1$ of 5° to 20°, preferably 15° relative to the respective imaginary vertical planes P, P. By this arrangement, the slides 38R, 38L can be smoothly moved within the respective guide recesses 40R, 40L since the distance between the upper end of the right guide recess 40r and that of the left guide recess 40L is equal to the distance between the lower end of the right guide recess 40R and that of the left guide recess 40L.

Figure 9:
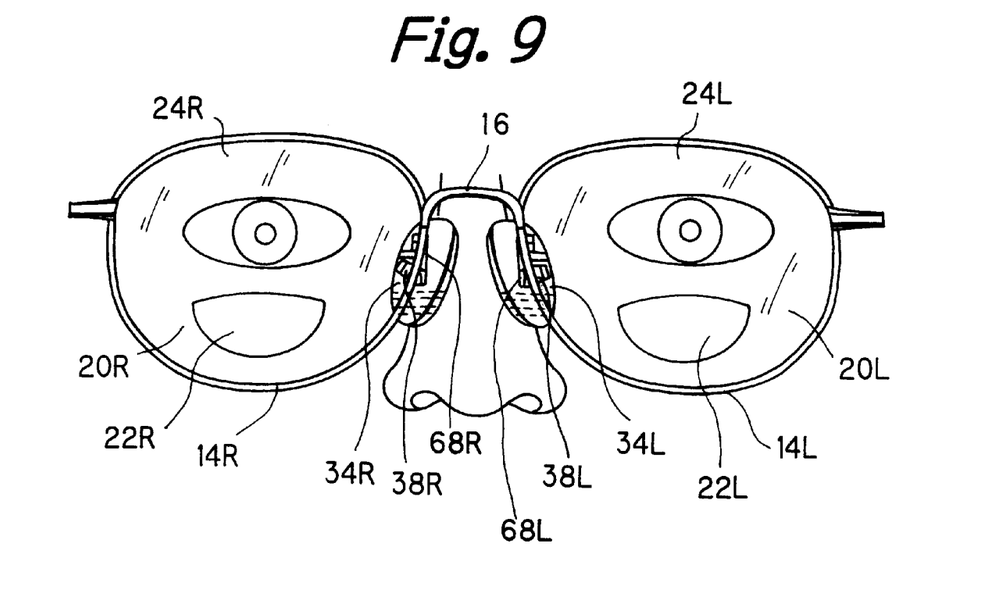
FIGS. 9 and 10 are front and side views of the ophthalmic mounting with a modified form of the nose pads.
Figure 10:
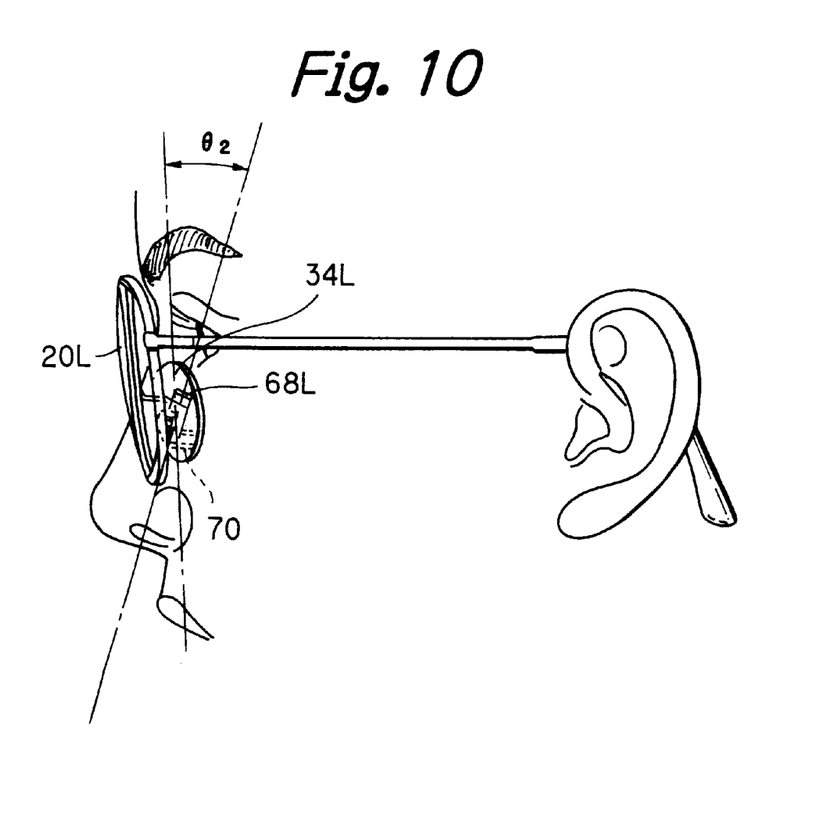

In the embodiment shown in FIGS. 1 to 8, the guide recesses 40R, 40L are normally disposed in the respective imaginary vertical planes P. P. Alternatively, guide recesses 68R, 68L may be inclined rearwardly toward the ears of a user, as shown in FIGS. 9 and 10. The angle $\theta_2$ of inclination of the guide recesses 68R, 68L may be in the range from 5° to 20°, preferably 15°. It is to be understood that the guide recesses 68R, 68L also lie on the two parallel imaginary vertical planes P, P.

As shown in FIGS. 3, 4 and 10, the nose pads 28R, 28L may preferably include a plurality of transverse grooves 70 to thereby firmly place the nose pads 28R, 28L in position on the respective nose of a user.

Figure 11:
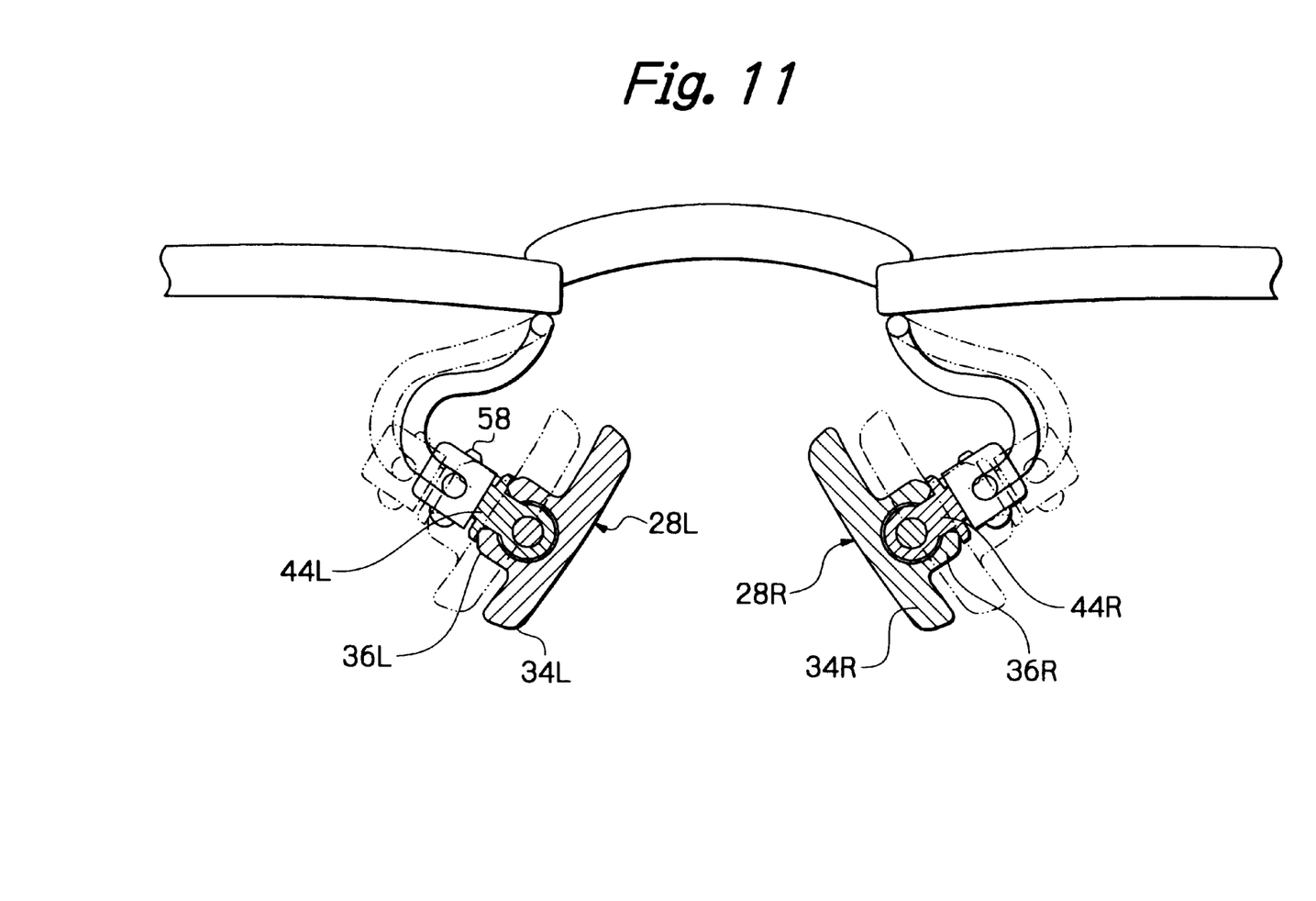
FIG. 11 is a sectional view of the nose pads, shown in FIG. 5, when secured to an existing eyeglass frame.
Figure 17:
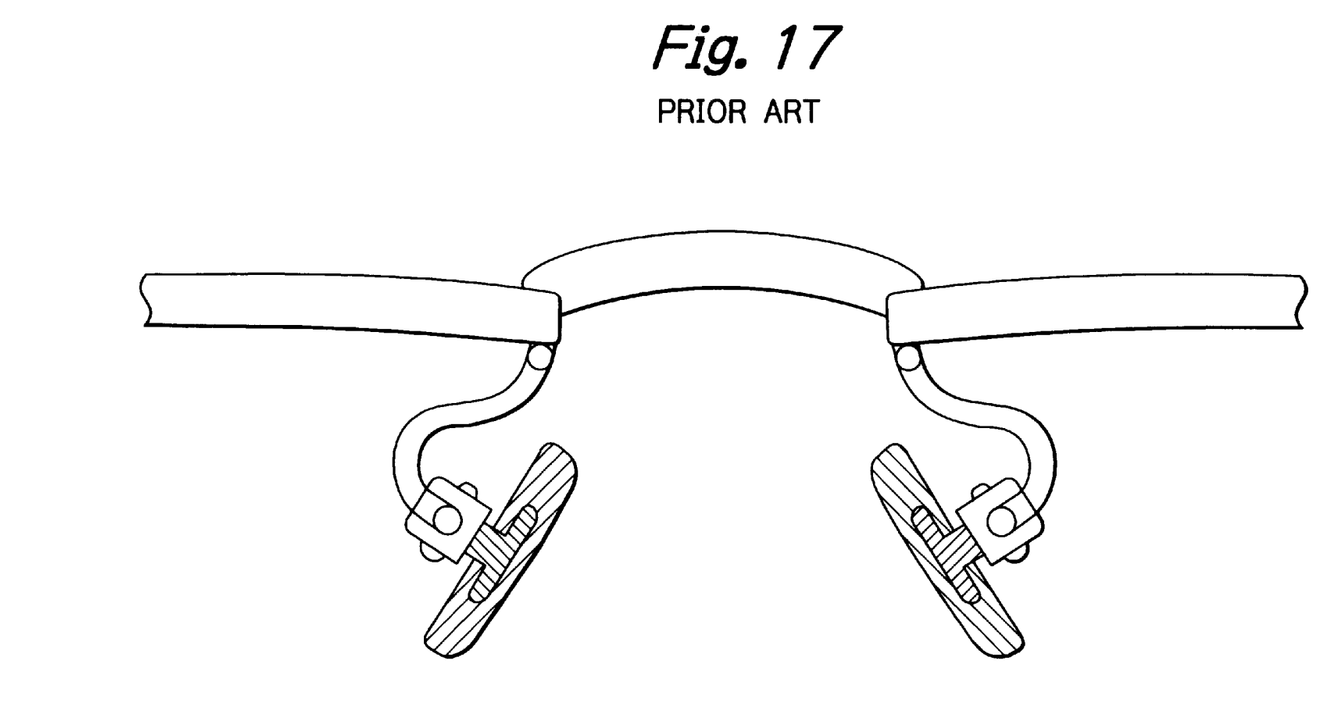
FIG. 17 is a top view of an ophthalmic mounting with a pair of conventional nose pads shown in section.

In the present invention, the slides 38R, 38L and the guides 36R, 36L collectively constitute a mounting mechanism. With the use of this mechanism, existing normal eyeglasses may be used as bifocal eyeglasses only by changing lenses. Also, existing bifocal eyeglasses may be firmly fixed in the desired position on the nose of a user. It should be noted that the nose pads 28R, 28L of the present invention (see FIG. 11) are thicker than typical nose pads known in the art (see FIG. 17) by an amount, approximately 2 mm, corresponding to the thickness of part of the mounting mechanism. In other words, the distance between the nose pads 28R, 28L is shorter than the distance between those of the conventional ophthalmic mounting. As such, adjustment is, in most cases, required when the nose pads 28R, 28L are attached to an existing ophthalmic mounting or frame. As specifically shown in FIG. 11, the nose pads 28R, 28L as well as pad arms of the existing frame must be moved away from each other in a direction generally parallel to the plane of the lenses. However, this adjustment requires a substantial amount of experience and time.

Figure 12:
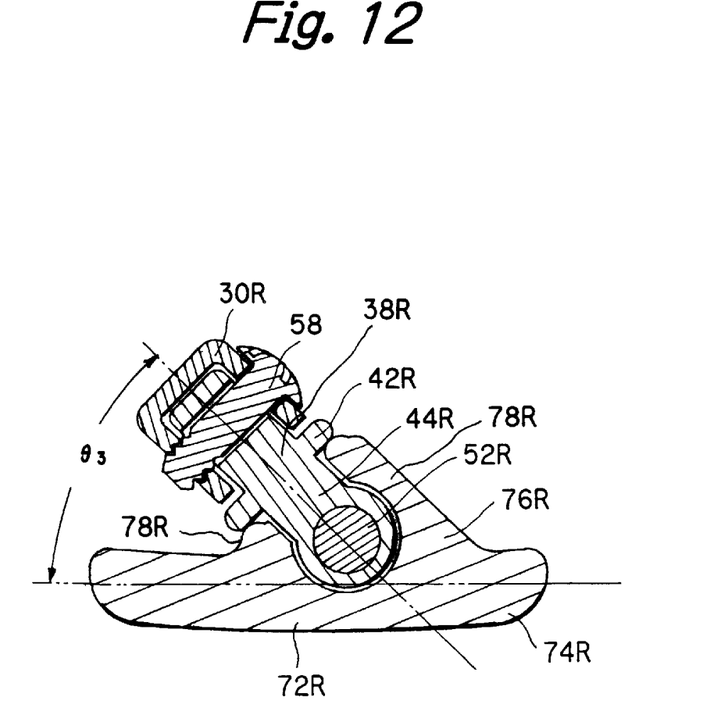
FIG. 12 is a view similar to FIG. 5, but showing a modified form of the nose pad.
Figure 13:
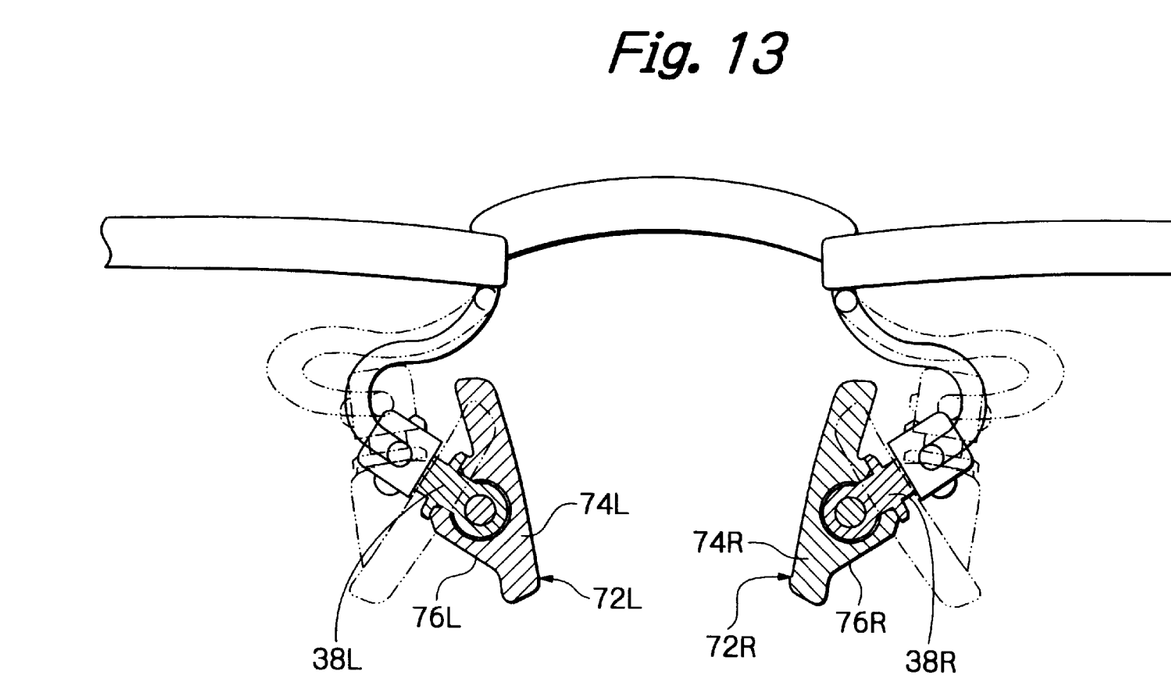
FIG. 13 is a sectional view of the nose pads, shown in FIG. 12, when secured to an existing eyeglass frame.

FIGS. 12 and 13 illustrate a modified form of the nose pads. Specifically, right and left nose pads 72R, 72L include respective right and left bodies 74R, 74L. Elongated right and left guides 76R, 76L are integrally formed in the respective bodies 74R, 74L as in the previous embodiment, but have opposite inclined surfaces 78R, 78L. The guides 76R, 76L thus have a triangular cross section. The slides 38R, 38L are identical in structure and shape to those in the previous embodiment, but disposed at an angle $\theta_3$, for example in the range from 20° to 50°, to the bodies 74R, 74L so as to reduce the overall height or thickness of the nose pads 72R, 72L. Adjustment is also required when the nose pads 72R, 72L are attached to an existing ophthalmic mounting, as shown in FIG. 13. In this example, the nose pads 72R, 72L are moved toward the lenses. Movement of the nose pads 72R, 72L toward the lenses (see FIG. 13) is much easier than movement of the nose pads 28R, 28L along the lenses (see FIG. 11).

Figure 14:
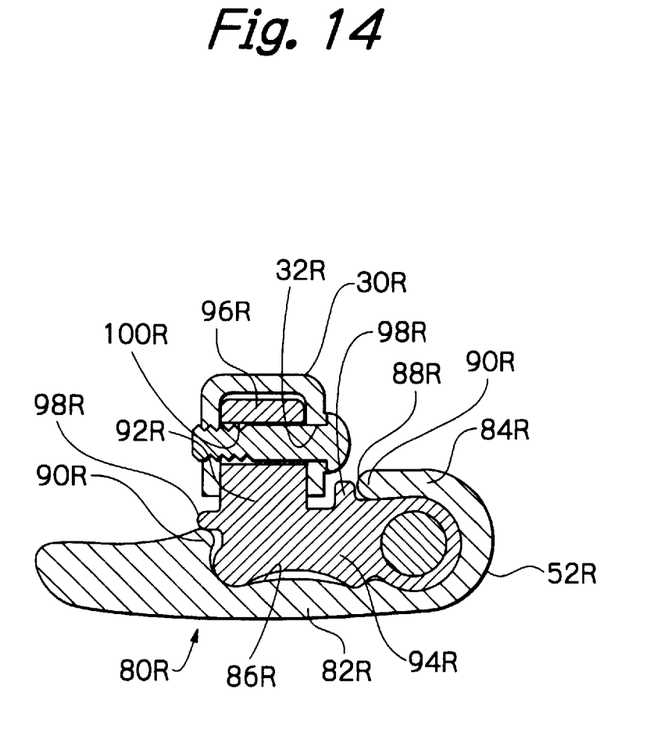
FIG. 14 is a view similar to FIG. 5, but showing a further modified form of the nose pad.
Figure 15:
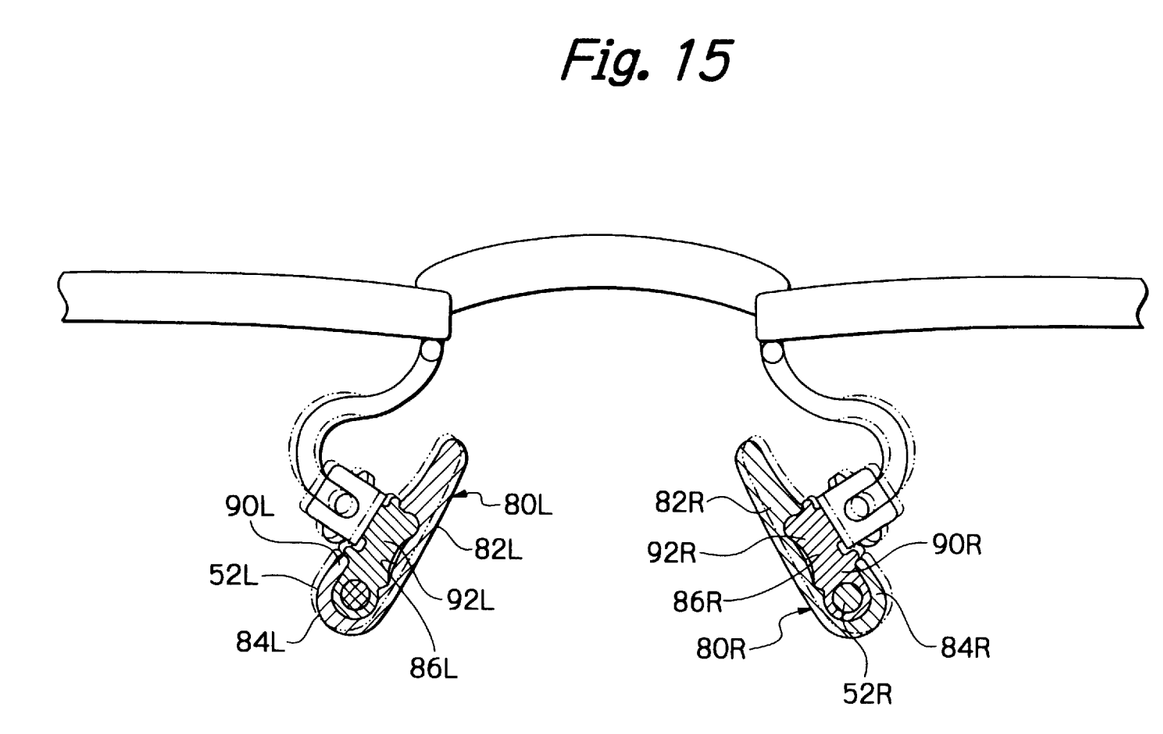
FIG. 15 is a sectional view of the nose pads, shown in FIG. 14, when secured to an existing eyeglass frame.

FIGS. 14 and 15 illustrate a further modified form of the nose pads. Specifically, right and left nose pads 80R, 80L include relatively thin bodies 82R, 82L, and guides 84R, 84L integrally formed in the bodies 82R, 82L. The bodies 82R, 82L and the guides 84R, 84L are disposed within the same thickness. The guides 84R, 84L include elongated guide recesses 86R, 86L and elongated openings 88R, 88L defined by two opposite edges 90R, 90L and communicated with the guide recesses 86R, 86L. A pair of right and left slides 92R, 92L include horizontal sliding portions 94R, 94L slidably received within the respective guide recesses 86R, 86L, and vertical mounting portions 96R, 96L extending substantially perpendicularly from one end of the sliding portions 94R, 94L. The movable magnets 52R, 52L are mounted within the other end of the sliding portions 94R, 94L. A pair of opposite flanges 98R, 98L extend from the sliding portions 94R, 94L and are engaged with the opposite edges 90R, 90L of the guides 84R, 84L. The mounting portions 96R, 96L have through holes 100R, 100L which are aligned with the through holes 32R, 32L of the mounts 30R, 30L when the nose pads 80R, 80L are attached to the respective pad arms. As is clear from the drawings, the nose pads 80R, 80L of this embodiment are less in thickness than those of the other embodiments. This embodiment thus requires only a slight amount of adjustment of the nose pads 80R, 80L as shown in FIG. 15.

While the particular preferred embodiments of the present invention has been described and shown, it is not intended to be exhaustive or to limit the invention to the precise form disclosed. Many variations and modifications may be made without departing from the scope and sprit of the invention as defined by the appended claims.

What is claimed is:

1. An ophthalmic mounting for bifocal lenses, comprising:

a pair of right and left lens holding elements adapted to mount a corresponding pair of right and left eyeglass lenses each having a plurality of focal fields, said pair of right and left lens holding elements being symmetrically arranged with respect to a vertical axis;

a pair of right and left pad arms having distal ends, and proximal ends connected to said corresponding pair of right and left lens holding elements; and a pair of right and left nose pads detachably secured to said corresponding pair of right and left pad arms and arranged to diverge downwardly from said vertical axis, said pair of right and left nose pads including:

a corresponding pair of right and left bodies, each of said pair of right and left bodies having an upper end, a lower end, and an axis extending between said upper and lower ends thereof and inclined relative to said vertical axis, said pair of right and left bodies further including a corresponding pair of elongated right and left guide recesses;

a corresponding pair of right and left slides having a pair of right and left sliding portions slidably received within said pair of right and left guide recesses, respectively, and a pair of right and left mounting portions connected to said pair of right and left sliding portions, respectively and detachably secured to said distal ends of said pair of right and left pad arms;

a pair of right and left upper magnets fixedly mounted within said corresponding pair of right and left guide recesses and located adjacent to said respective upper end of said pair of right and left bodies;

a pair of right and left lower magnets fixedly mounted within said corresponding pair of right and left guide recesses and located adjacent to said respective lower end of said pair of right and left bodies; and a pair of right and left movable magnets mounted to said corresponding pair of right and left sliding portions and selectively attached to said pair of right and left upper and lower magnets, said pair of right and left guide recesses lying on two substantially parallel imaginary vertical planes, respectively.

2. An ophthalmic mounting according to claim 1, wherein said axes of said pair of right and left bodies are inclined at an angle of 5 to 20 degrees relative to said two imaginary vertical planes, respectively.

3. An ophthalmic mounting according to claim 1, wherein said pair of right and left guide recesses are normally disposed in said two imaginary vertical planes.

4. An ophthalmic mounting according to claim 1, wherein said pair of guide recesses are rearwardly inclined at an angle of 5 to 20 degrees relative to a normal.

5. An ophthalmic mounting according to claim 1, wherein each of said pair of right and left bodies has one side and an other side, said pair of right and left slides being mounted to said one side of said pair of right and left bodies, each of said pair of right and left bodies having a plurality of transverse grooves on its other side.

6. An ophthalmic mounting according to claim 1, wherein said pair of right and left bodies include a corresponding pair of elongated right and left guides within which said pair of right and left guide recesses are defined, said pair of right and left guides having a substantially rectangular cross section.

7. An ophthalmic mounting according to claim 1, wherein said pair of right and left bodies include a corresponding pair of elongated right and left guides within which said pair of right and left guide recesses are defined, said pair of right and left guides having a substantially triangular cross section.

8. An ophthalmic mounting according to claim 7, wherein said pair of right and left sliding portions and said pair of right and left mounting portions have a common central axis, said common central axis being inclined at an angle of 20 to 50 degrees relative to each of said pair of right and left bodies.

9. An ophthalmic mounting according to claim 1, wherein said pair of right and left sliding portions extend substantially perpendicularly from one side of said pair of right and left mounting portions, said pair of right and left sliding portions extending generally parallel to said pair of right and left bodies.

10. A set of nose pads adapted for use in an ophthalmic mounting, said nose pads being detachably secured to a corresponding set of pad arms of the ophthalmic mounting and when secured, oriented to diverge downwardly from a vertical axis, said set of nose pads comprising:

a corresponding set of bodies, each of said bodies having an upper end, a lower end, and an axis extending between said upper and lower ends thereof and inclined relative to said vertical axis, said bodies further including a corresponding set of elongated guide recesses;

a corresponding set of slides having sliding portions slidably received within said respective guide recesses, and mounting portions connected to said respective sliding portions and adapted to be detachably secured to the respective pad arms;

a set of upper magnets fixedly mounted within said respective guide recesses and located adjacent to said upper end of said respective bodies;

a set of lower magnets fixedly mounted within said respective guide recesses and located adjacent to said lower end of said respective bodies; and a set of movable magnets mounted to said respective sliding portions and selectively attached to said upper and lower magnets, said guide recesses lying on two substantially parallel imaginary vertical planes, respectively.

11. An ophthalmic mounting according to claim 10, wherein said axes of said bodies are inclined at an angle of 5 to 20 degrees relative to said two imaginary vertical planes, respectively.

12. An ophthalmic mounting according to claim 10, wherein said guide recesses are normally disposed in said two imaginary vertical planes, respectively.

13. An ophthalmic mounting according to claim 10, wherein said guide recesses are rearwardly inclined at an angle of 5 to 20 degrees relative to a normal.

14. An ophthalmic mounting according to claim 10, wherein each of said bodies has one side and an other side, each of said slides being mounted to said one side of each of said bodies, each of said bodies having a plurality of transverse grooves on its other side.

15. An ophthalmic mounting according to claim 10, wherein said bodies include a corresponding set of elongated guides within which said guide recesses are defined, said guides having a substantially rectangular cross section.

16. An ophthalmic mounting according to claim 10, wherein said bodies include a corresponding set of elongated guides within which said guide recesses are defined, said guides having a substantially triangular cross section.

17. An ophthalmic mounting according to claim 16, wherein said sliding portions and said mounting portions have a common central axis, said common central axis being inclined at an angle of 20 to 50 degrees relative to each of said bodies.

18. An ophthalmic mounting according to claim 10, wherein said sliding portions extend substantially perpendicularly from one side of said mounting portions, said sliding portions extending generally parallel to said respective bodies.

* * * * *